United States Patent [19]

Blase

[11] 4,369,998
[45] Jan. 25, 1983

[54] TWIN TORSIONAL BICYCLE SEAT UNDERCARRIAGE

[76] Inventor: Robert Blase, 1009 Round Hill Rd., Fairfield, Conn. 06430

[21] Appl. No.: 183,302

[22] Filed: Sep. 2, 1980

[51] Int. Cl.³ ............................................. B62J 1/00
[52] U.S. Cl. .................................... 297/195; 297/214; 297/201
[58] Field of Search ................ 297/201, 204, 215, 195

[56] References Cited

U.S. PATENT DOCUMENTS

| | | | |
|---|---|---|---|
| 544,625 | 8/1895 | Montague | 297/195 |
| 569,981 | 10/1896 | Strakosch | 297/201 |
| 579,034 | 3/1897 | Batt | 297/201 X |
| 618,601 | 1/1899 | Darling | 297/201 X |
| 620,946 | 3/1899 | Meisselbach et al. | 297/215 X |
| 679,537 | 7/1901 | Naber . | |
| 2,149,247 | 2/1939 | Mesinger . | |
| 2,244,956 | 6/1941 | Miller et al. | 297/214 |
| 3,708,201 | 1/1973 | Lamkemeyer | 297/214 |

*Primary Examiner*—Roy D. Frazier

*Assistant Examiner*—Peter A. Aschenbrenner
*Attorney, Agent, or Firm*—Mattern, Ware, Davis and Stoltz

[57] ABSTRACT

By providing two independent torsionally flexible loop systems, each incorporating a curved wire loop portion and a stabilized portion which anchors the loop portion with a resilient, torsionally flexible quality, a unique bicycle seat undercarriage is achieved which provides dual, independent, resilient loop deflection at the areas of maximum load, with resilient loop return to their original positions when the deflection force is removed. Preferably, the bicycle seat undercarriage incorporates a wire holdng and clamping bracket adapted for mounting engagement with a bicycle seat post and at least one elongated wire member securely affixed along a portion thereof to said bracket and extending from said clamped position in a substantially uniformly curved loop with its terminating end holdingly engaged with said bracket. In the preferred embodiment, a single continuous wire is employed which also forms the forward leading pommel end of the undercarriage.

17 Claims, 9 Drawing Figures

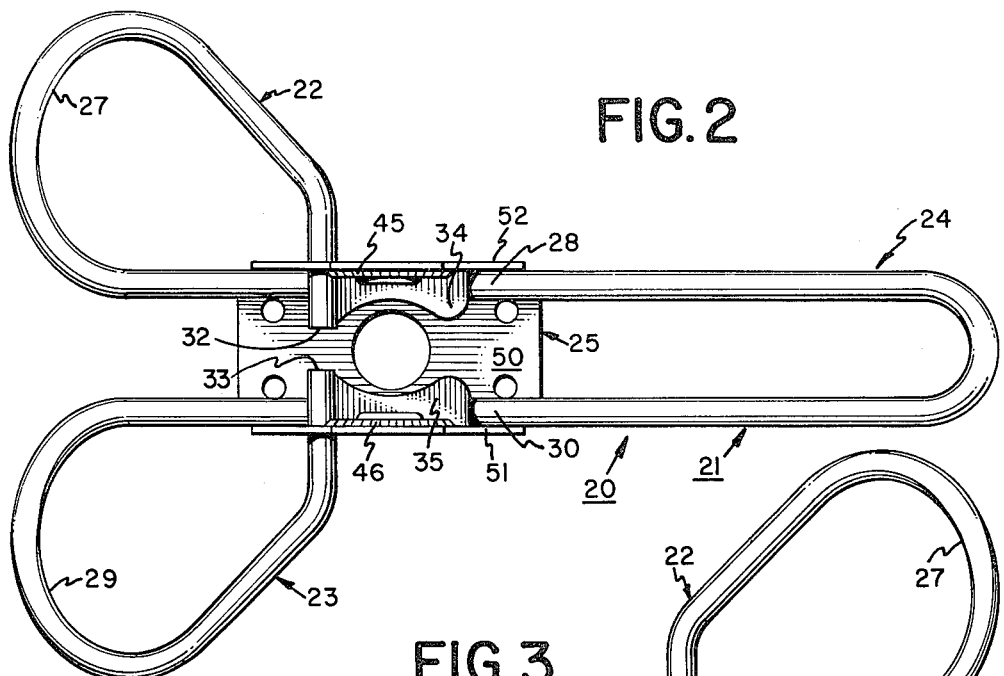
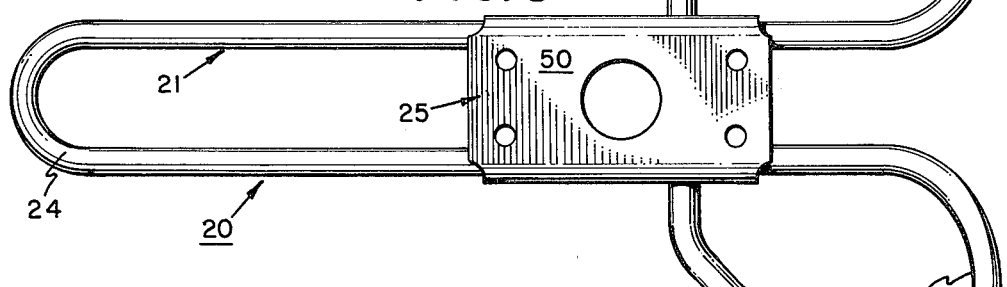
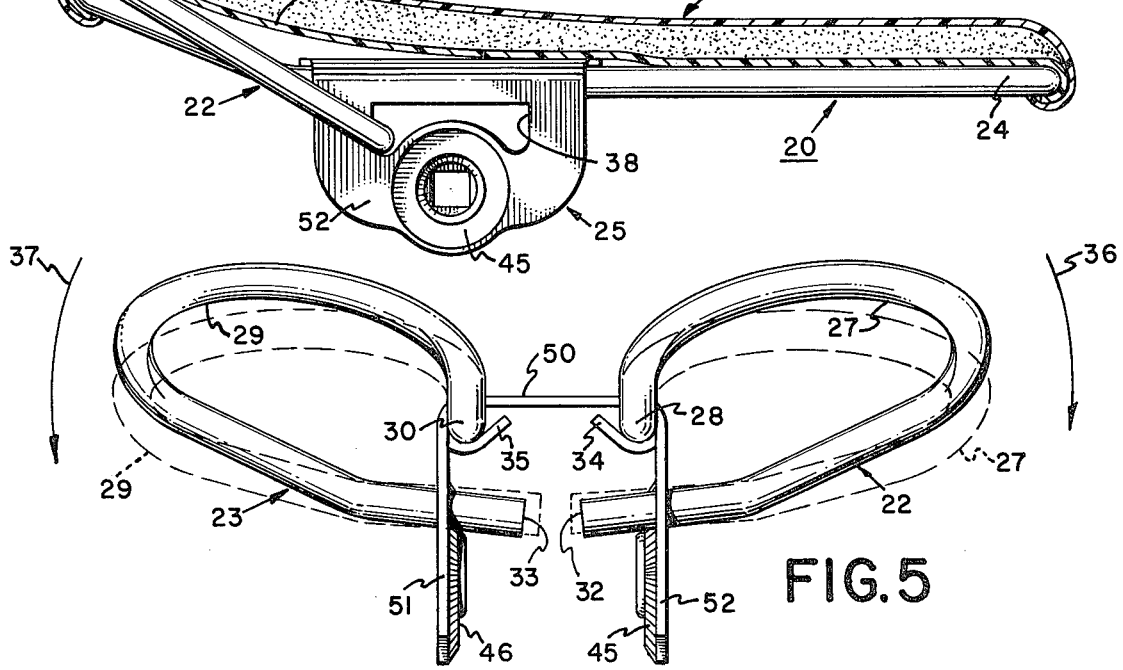

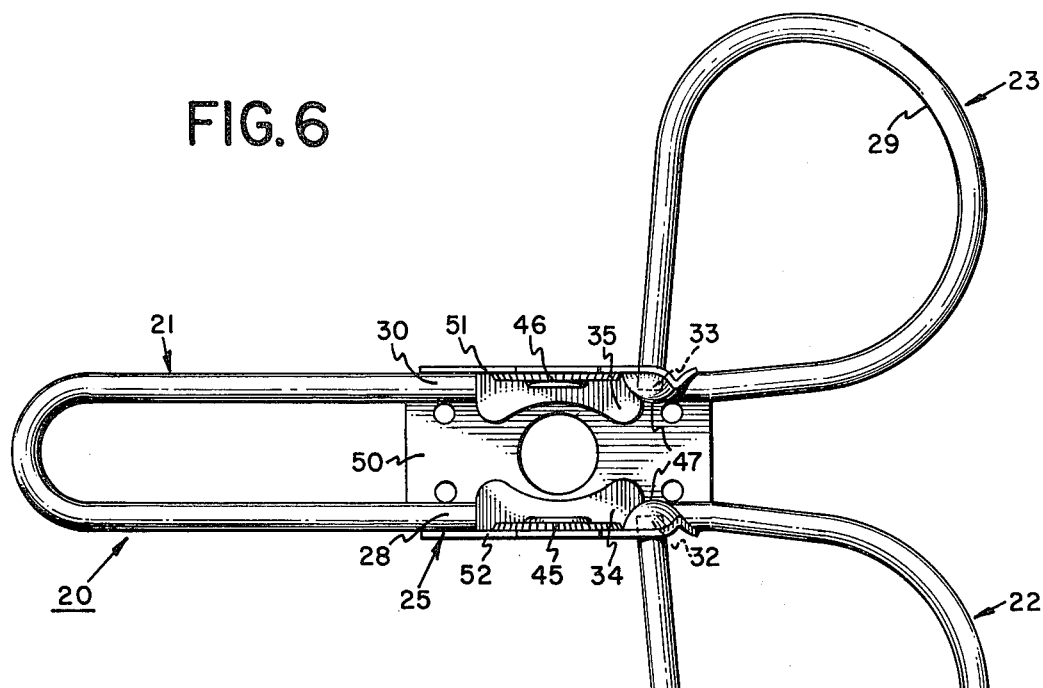
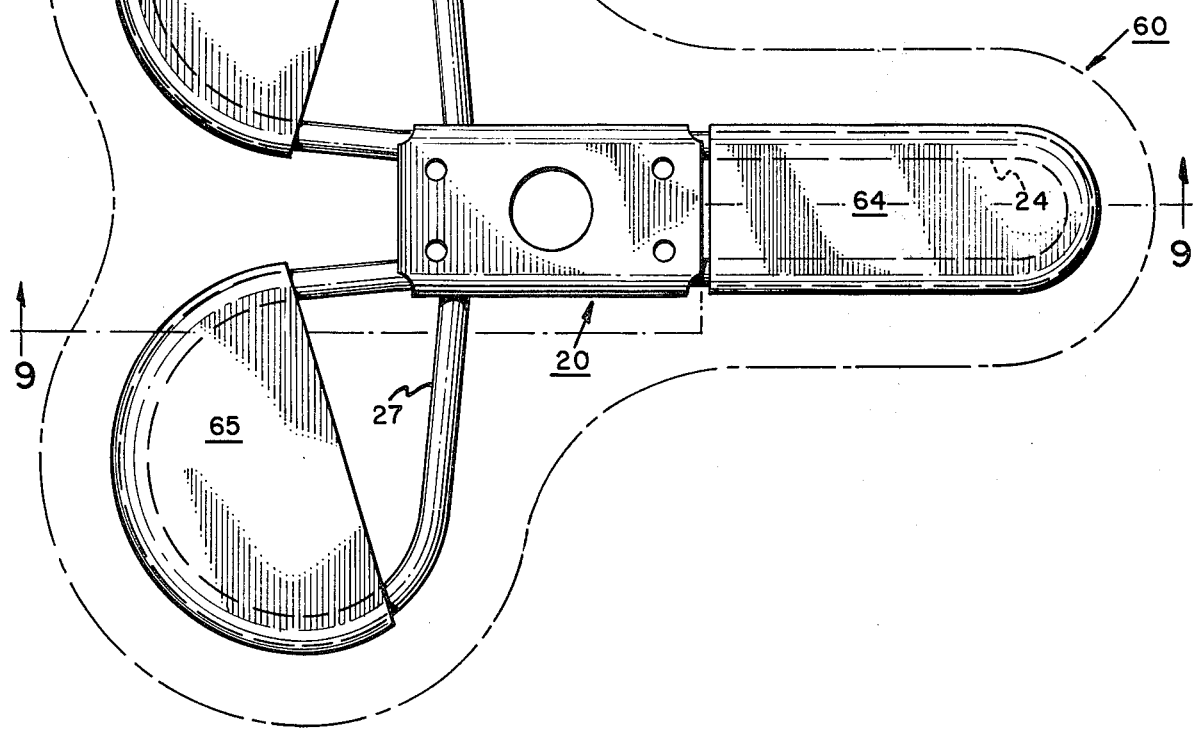

TWIN TORSIONAL BICYCLE SEAT UNDERCARRIAGE

TECHNICAL FIELD

This invention relates to bicycle seats and more particularly to bicycle seat undercarriages incorporating pre-formed wire support systems.

BACKGROUND ART

Throughout the many years that bicycle seats have been employed, numerous variations and developmental improvements have evolved in a continuing effort to improve the comfort of the bicycle seat and its ability to support the rider, as well as provide resilient flexibility as the rider shifts his weight from one side to the other. Although various alternative materials have been employed in an attempt to attain a bicycle seat supporting undercarriage which would attain the ideal goals many innovative developments have employed pre-formed wire in the bicycle seat undercarriage. The following list of patents provides a representative sample of prior art developments that have been produced employing pre-formed wire undercarriage constructions:

Downes—U.S. Pat. No. 591,330, issued Oct. 5, 1897
Naber—U.S. Pat. No. 679,537, issued July 30, 1901
Mesinger—U.S. Pat. No. 2,149,247, issued Feb. 28, 1939
Young—U.S. Pat. No. 3,844,611, issued Oct. 29, 1974
Mesinger—U.S. Pat. No. 3,884,525, issued May 20, 1975

As clearly represented by these U.S. Patents, pre-formed wires have been employed principally as spring members in order to provide the support and resilient flexibility required by a bicycle seat. As clearly shown in both Downes and Young, the desirability of comfortably supporting the ischial bones of the rider independently has been a sought after goal from 1897 through to the present.

However, prior art bicycle seats have been unable to provide the required independent resilient flexibility inherent in a comfortably acceptable bicycle seat at a reasonable cost. One of the principle factors in this prior art failure has been the consistent use of pre-formed wire in undercarriages as coil springs, in order to support the rider's weight. As a result, large quantities of wire were required along with interconnecting hardware to assure cooperative interplay of the various coils. This caused these support systems to be both heavy and expensive to manufacture.

Another major difficulty with prior art wire undercarriages is the substantially universal construction of the wire undercarriages in an unloaded configuration which is substantially identical to the ideal loaded configuration. As a result, any weight placed on the seat by the rider changes the seat from its ideal supporting configuration to a loaded configuration which is not ideal.

Therefore, it is the principle object of the present invention to provide a bicycle seat having a pre-formed wire undercarriage which is inexpensive to manufacture and provides a comfortable support system for a rider.

Another object of the present invention is to provide a bicycle seat undercarriage having the characteristic features described above which departs from the prior art teachings for use of pre-formed wire and employs the torsional physical characteristics of the wire instead of the typically used helical compression spring characteristics.

Another object of the present invention is to provide a bicycle seat undercarriage having the characteristic features described above which also provides a dual, independent resilient deflection in the seat support portions, maximizing rider comfort and supportive movement of the seat in response to the movement of the rider.

Another object of the present invention is to further incorporate two independent seat support portions which are moved into an ideal supporting configuration when loaded.

Other and more specific objects will in part be obvious and will in part appear hereinafter.

DISCLOSURE OF THE INVENTION

The present invention overcomes all of the prior art difficulties and drawbacks by manufacturing a bicycle seat undercarriage which employs two independent, torsional flexible loop systems. The loop systems are positioned on opposed sides of the undercarriage, and each incorporates a substantially continuously curved, wire loop portion, preferably arrayed tilted forwardly and inwardly, with a majority of the loop portion lying in substantially the same plane. Preferably, this plane slants upwardly from the horizontal. In addition, each loop system incorporates an integral portion, directly contiguous with the loop portion and provides a longitudinal axis about which the loop portion is free to torsionally deflect when loaded.

By employing the construction of the present invention, an inexpensive bicycle seat undercarriage is achieved, which is capable of controlled independent resilient deflection of each seat supporting loop system in response to the weight shifting of the rider. Furthermore, since the major portions of both loop portions lie in diverging planes which extend from the horizontal upwardly in opposed directions, the bicycle seat undercarriage of the present invention is generally maintained in an unloaded configuration in which the undercarriage does not lie in a substantially flat, continuous horizontal plane, as is typically found in prior art undercarriages. The bicycle seat undercarriage of the present invention is usually moved into the conventional substantially horizontal planar configuration when the undercarriage is subjected to normal weight loads. Consequently, the undercarriage of the present invention attains the ideal configuration for the rider when the rider is on the seat. As a result, the bicycle seat undercarriage of the present invention provides a more comfortable support for a rider by achieving an ideal support configuration in response to the rider's weight.

In the preferred embodiment, a single elongated continuous wire is employed in combination with a single bracket member. With this two piece assembly, an extremely inexpensive bicycle seat undercarriage is attained which is quickly and easily manufactured and assembled, while also achieving all of the desired supporting characteristics.

In a further embodiment of the present invention, the wire undercarriage of the present invention is employed as the central portion in a mold, wherein an entire unitary plastic seat is foamed in place peripherally surrounding and bondingly engaging the wire undercarriage within the foamed seat. When removed from the mold, an entire bicycle seat is achieved with both the cover and cushioning material comprising the plastic foam, and the wire undercarriage providing the requisite support. The preferred construction also incorporates plastic or metal sleeves inserted over the pommel portion of the wire as well as over each loop, in order to provide added support and bonding surface area to assure secure supporting interengagement with the foamed material.

The invention accordingly comprises an article of manufacture possessing the features, properties, and the relation of elements which will be exemplified in the article hereinafter described and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 2 is a bottom plan view of the bicycle seat undercarriage of the present invention in one configuration;

FIG. 3 is a top plan view of the bicycle seat undercarriage of the present invention;

FIG. 4 is a side elevation view, partially in cross section, of a complete racing-type bicycle seat incorporating the bicycle seat undercarriage of the present invention;

FIG. 5 is a rear elevation view of the bicycle seat undercarriage of the present invention;

FIG. 6 is a bottom plan view of the bicycle seat undercarriage of the present invention in a second configuration;

FIG. 8 is a top plan view of the bicycle seat undercarriage of the present invention showing the undercarriage as the central support member of a foamed-in-place bicycle seat.

BEST MODE FOR CARRYING OUT THE INVENTION

Figure 1:
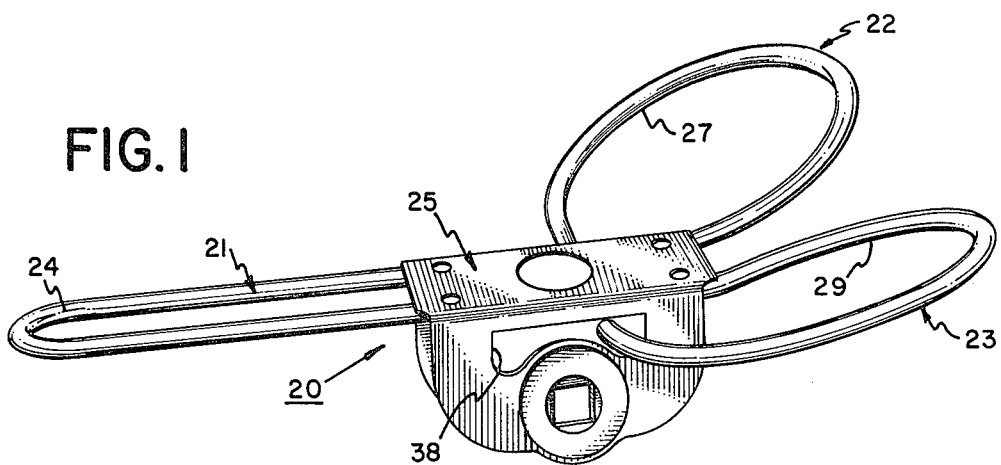
FIG. 1 is a perspective view of the bicycle seat undercarriage of the present invention.

In FIGS. 1-9, the preferred embodiment of bicycle seat undercarriage 20 of the present invention is shown. In this embodiment, bicycle seat undercarriage 20 comprises a single, elongated, continuous wire member 21 which is formed into an undercarriage supporting configuration and is securely mounted to a bracket 25.

In this preferred embodiment, continuous wire member 21 is formed into two independent, resilient, torsionally flexible loop systems 22 and 23, and a pommel portion 24. Independent, torsionally flexible loop system 22 incorporates a continuous loop portion 27 and a stabilized portion 28, mounted to bracket 25. Similarly, torsionally flexible loop system 23 incorporates continuous loop portion 29 and stabilized portion 30 secured to bracket 25.

Throughout the drawings, undercarriage 20 of the present invention is depicted as either a racing-type bicycle seat undercarriage or a touring-type bicycle seat undercarriage. However, these representations are employed merely for exemplary purposes, and are not intended in any way to limit the scope of the present invention. The configurations depicted throughout the drawings are merely to show the undercarriage system of the present invention in the conventional size and shape, but alternative configurations may be manufactured to any particular dimensions or wire lengths without in any way departing from the scope or teaching of the present invention.

As best seen in FIGS. 1, 2, and 5-7, curved loop portion 27 comprises a single loop configuration extending contiguously from stabilized portion 28 in a substantially continuous curve with its terminating end 32 securely retained in bracket 25. Similarly, loop portion 29 extends from stabilized portion 30 in a substantially continuous loop configuration with its terminating end 33 retainingly engaged with bracket 25.

Bracket 25 is preferably constructed as an easily manufactured metal stamping, incorporating central body 50 and depending sides 51 and 52. Sides 51 and 52 are constructed with grooved cooperating zones 45 and 46 formed therein ready for cooperating engagement with a conventional bicycle seat clamp and bolt assembly for mounting to the bicycle seat post. In addition, bracket 25 serves as a holding and retaining member for wire member 21 and securely maintains stabilized portions 28 and 30 of torsionally flexible loop systems 22 and 23 in their secured position.

Bracket 25 also incorporates clamping arms 34 and 35 to peripherally surround and securely frictionally engage stabilized portions 28 and 30. In this embodiment of bracket 25, ends 32 and 33 of loop portions 27 and 29 are retainingly held in bracket 25 by positioning ends 32 and 33 through portals 38, formed in sides 51 and 52 of bracket 25. With this construction, ends 32 and 33 are free to slide towards and away from each other, but are unable to move forward or rearward in response to conventional loading.

Figure 7:
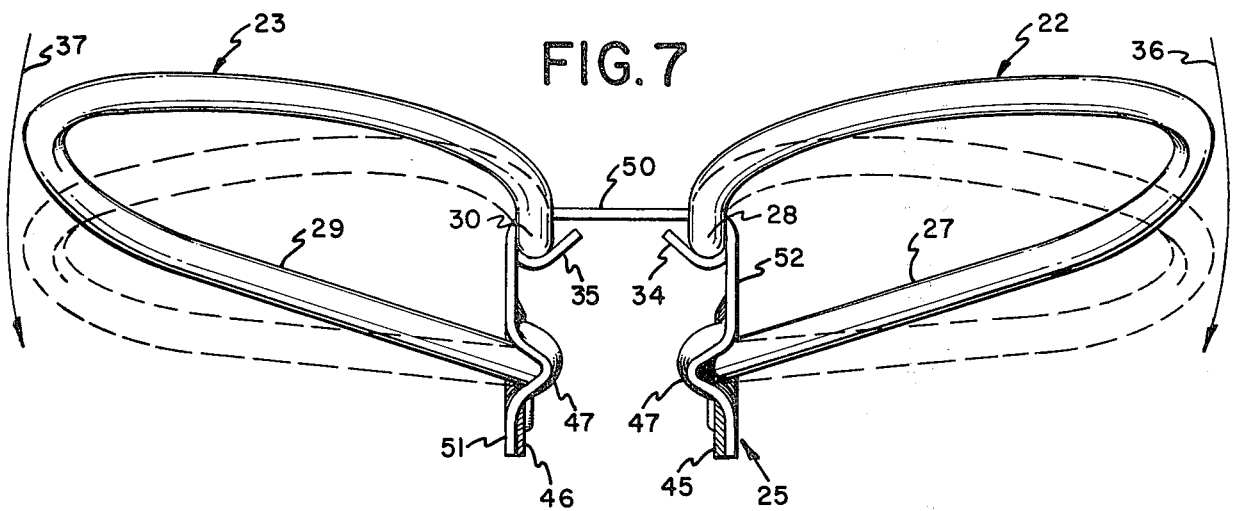
FIG. 7 is a rear elevation view of the bicycle seat undercarriage of the present invention.

In FIGS. 6, 7, and 8, an alternative configuration for bracket 25 is shown. In this configuration, bracket 25 also incorporates end receiving pockets or recesses 47 formed in each depending side 51 and 52 of bracket 25. Preferably, pockets 47 are positioned at the rear of depending side 51 and 52 adjacent portal 38. In this configuration, the terminating ends 32 and 33 of loop portions 27 and 29 are positioned in secure retained engagement with recesses 47 of bracket 25, and loop portions 27 and 29 are free to independently, resiliently, torsionally deflect.

Although both embodiments for bracket 25 are substantially equivalent and employable with virtually any wire member 21 in any desired configuration, bracket 25 with recesses 47 is generally more desirable to employ as the diameter of loop portions 27 and 29 are increased. It has been found, that if ends 32 and 33 of loop portions 27 and 29 are positioned at the rear of portal 38, as represented in FIG. 4, when undercarriage 20 is in the touring-type bicycle seat configuration, preferred by heavier riders, the independent, resilient, torsional deflection of loop portions 27 and 29, in response to the shifting weight of the rider, causes ends 32 and 33 to move longitudinally towards each other. In certain conditions, typically under an extremely heavy load, the end portions 32 and 33 may move longitudinally a sufficient distance to contact each other. Since this rubbing contact between ends 32 and 33 is unnecessary and may be eliminated, bracket member 25 with recesses 47 has been found to be the more desirable configuration to employ when loop portions 27 and 29 comprise larger diameters.

Loop systems 22 and 23 are constructed to provide loop portions 27 and 29 with independent, resilient, torsional flexibility, in order to assure a smooth, fully supported, comfortable ride. As shown in FIGS. 5 and 7, loop portion 27 torsionally flexes in the direction shown by arrow 36 when a load is applied to loop system 22. One torsionally deflected position of loop portion 27 is shown in phantom. As is apparent from FIGS. 5 and 7, the central axis of stabilized portion 28 establishes the fixed longitudinal axis which provides loop portion 27 with the mechanical capability to achieve its independent, resilient torsional flexibility.

Similarly, stabilized portion 30 establishes a fixed longitudinal axis which provides loop portion 29 with the mechanical stability to be independently, resiliently, torsionally flexible. The independent, resilient, torsional flexible movement of loop portion 29 is represented in phantom in FIGS. 5 and 7, with its direction of movement when loaded shown by arrow 37.

Bicycle seat undercarriage 20 of the present invention with its twin, independent, resilient, torsional flexibility loop establishes a construction which provides an exceptionally comfortable support for a bicycle rider. Each of the torsionally flexible loop systems 22 and 23 are capable of independent flexible movement and resilient support for each of the ischial bones of the rider. In addition, their independent torsional flexibility assures that bicycle seat undercarriage 20 of the present invention supportingly moves with the continuously shifting weight of the rider as the rider pedals the bicycle.

One important aspect of the bicycle seat undercarriage 20 of this invention, which is believed to establish the comfortable rider support achieved, is the construction of loop portions 27 and 29 with both diverging dihedral angles and forwardly sloping angles. As best seen in FIGS. 1, 4, 5, and 7, loop portions 27 and 29 of bicycle seat undercarriage 20 of the present invention each lie in substantially a single plane and combine to establish a dish-shaped rear support zone.

This dish-shaped zone is achieved by having loop portions 27 and 29 diverging from the longitudinal axis of undercarriage 20 in their respective planes at an upwardly extending dihedral angle, while each plane is also forwardly sloping downwardly. As a result, loop portions 27 and 29 form a supporting system for comfortably maintaining and supporting the weight of a rider in a configuration substantially conforming to the rider's configuration, while also achieving independent, twin, resilient, torsional flexibility for comfortably supporting and resiliently responding to the shifting weight of the rider as the rider pedals the bicycle.

Although the particular angles which are employed to form the dish-shaped rear support zone may vary depending upon a particular desired configuration or the particular type of bicycle seat configuration being manufactured, it has been generally found that the diverging dihedral angle formed by loop portions 27 and 29 is preferably between 5 degrees and 30 degrees. In addition, the forwardly, sloping angle of loop portions 27 and 29 is preferably between 5 degrees and 45 degrees.

The precise angular relationship which is employed in a particular bicycle seat undercarriage may vary considerably depending upon the particular configuration of the bicycle seat undercarriage and the typical load conditions to which the bicycle seat is expected to be exposed. In general, the racing-type bicycle seat undercarriage configuration employs a loop portion having a smaller diameter than is employed with the touring-type bicycle seat undercarriage configuration. As a result, loop portions 27 and 29 in the racing-type configuration will have an arcuate deflection which is less than the arcuate deflection of the loop portions of the touring-type bicycle seat undercarriage configuration. Consequently, a smaller dihedral angle is employed in the racing-type bicycle seat configuration than is preferably employed in the touring-type bicycle seat undercarriage configuration.

Once the dihedral angle is established for a particular undercarriage configuration, the forward sloping angle is established at a complementary angular relationship which will establish the desired dish-shaped rider receiving zone with its requisite comfort and supporting stability. In general, it has been found that as the dihedral angle is increased, the forward sloping angle is decreased.

In FIGS. 2-5, bicycle seat undercarriage 20 of the present invention is shown formed into the conventional configuration for a racing-type bicycle seat, while FIGS. 1 and 6-9 depict undercarriage 20 in the touring-type configuration. As shown in FIG. 4, the bicycle seat undercarriage 20 of the present invention is easily employed as the support in a conventional racing-type bicycle seat 40 by mounting to undercarriage 20 a support plate 41, padding 42, and a cover 43.

Support plate 41 comprises a conventional construction, typically plastic or metal, and is mounted about loop portions 27 and 28 and pommel portion 24. Padding material 42 is placed on top of plate 41 with cover 43 peripherally enveloping padding material 42 in the conventional manner which is well known in the art. The resulting product is a racing-type bicycle seat having a typical outward appearance, but which incorporates the unique, independent, twin, resilient, torsional flexible undercarriage support system 20 of this invention. As is readily apparent from this disclosure, the touring-type configuration may also be employed in a substantially identical manner to form a conventional touring-type bicycle seat which would employ the unique independent, twin, resilient, torsionally flexible loop undercarriage support system 20 of this invention.

If desired, wire member 21 can be employed in any alternate construction. In addition, if required, more than one wire member can be used. However, it has been found that the single elongated continuous wire member configuration is preferred.

In addition, the actual wire employed may be varied in wire quality and wire diameter. However, the more ductile the wire, the larger its diameter should be. In the preferred construction, steel wire is employed having a diameter ranging between 3/16 and 5/16 inches. Also, by employing the teaching of this invention, pommel portion 24 is assured of having inherent strength and rigidity to easily satisfy the pommel strength/deflection tests recognized and employed as the standard by the bicycle manufacturing industry.

It has also been discovered that configurations such as shown in FIG. 2, wherein the bicycle seat undercarriage of the present invention is employed in the racing-type seat configuration, heavier gauge wire is not needed due to the smaller diameter loops employed in the racing-type configuration. However, when the bicycle seat undercarriage 20 of the present invention is manufactured in the configuration typified in FIG. 5, namely the touring-type bicycle seat, a thicker wire member 21 is desirable, since the loop portions have a larger diameter and, therefore, are subjected to greater deflection forces.

Figure 9:
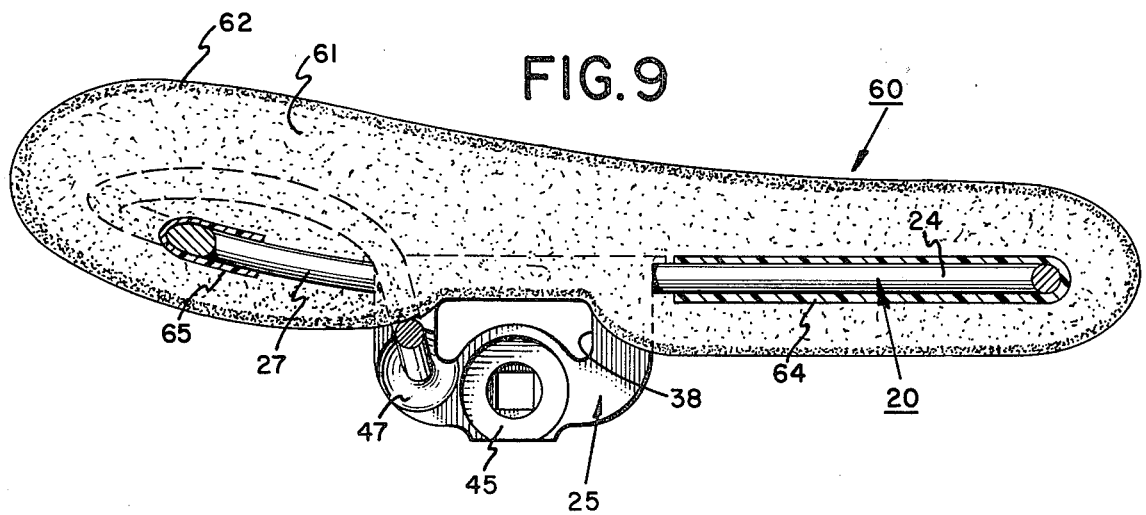
FIG. 9 is a cross sectional side elevation view taken along line 9—9 of FIG. 8 showing the bicycle seat undercarriage of the present invention foamed-in-place as the support portion of the unitary foamed bicycle seat.

In FIGS. 8 and 9, a uniquely constructed bicycle seat 60 is depicted incorporating bicycle seat undercarriage 20. In this configuration, bicycle seat undercarriage 20 is employed as the central support member to form a molded bicycle seat structure.

Bicycle seat undercarriage 20 comprises the central undercarriage support for bicycle seat 60 with the remainder of bicycle seat 60 comprising an integrally molded plastic foam material 61. As shown in FIG. 9, foam material 61 comprises both the cushioning material as well as the outside, exposed surface 62. In this way, complete bicycle seat 60 is easily and inexpensively manufactured by positioning undercarriage 20 in a mold cavity with the entire bicycle seat being formed thereabout in a simple one step molding operation employing foam material 61.

In the preferred embodiment, bicycle seat 60 is manufactured with undercarriage 20 incorporating sleeve members 64, 65, and 66 positioned on both loop portions 27 and 29, as well as pommel portion 24. As shown in FIGS. 8 and 9, pommel portion 24 incorporates sleeve member 64 which substantially envelopes pommel portion 24. Similarly, loop portion 27 is partially enveloped by sleeve member 65 and loop portion 29 is partially enveloped by sleeve member 66.

Although sleeve members 64, 65, and 66 are optional and may be employed if desired in the manufacture of bicycle seat 60, it has been found that sleeve members 64, 65, and 66 provide added surface area to which foam material 61 adheres. In this way, bicycle seat 60 has greater internal strength and inherent structural integrity.

By employing the molded, foamed-in-place bicycle seat 60 of this invention, an inexpensive, quickly and easily manufactured bicycle seat is achieved which also incorporates and provides the twin, independent, resilient, torsional loop flexibility achieved by undercarriage 20. As a result, bicycle seat 60 is capable of providing a lightweight bicycle seat, which is inexpensively manufactured and capable of long term, trouble-free use. In addition, as shown throughout the drawings, the bicycle seat undercarriage 20 of the present invention also attains a low profile bicycle seat undercarriage which greatly enhances the appearance and aesthetics of the bicycle seat. In addition, loop portions 27 and 29 provide a readily employable rear portion to which straps can be fastened for securing thereto tool bags or other desirable containers.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim is new and desire to secure by Letters Patent is:

1. A bicycle seat-supporting undercarriage comprising
   A. a bracket member adapted for cooperative interengagement with bolt means for mounting to a bicycle seat post, and
   B. a wire member formed into two independent loop systems extending rearwardly and laterally from said bracket member, each of said loop systems comprising
      (a) a secured portion mounted to the bracket member, and
      (b) a laterally extending loop portion
         (1) extending from the secured portion in a substantially continuous curve, and
         (2) having its terminating end retainingly engaged with said bracket member;
   C. said bracket member having
      (a) a central body portion and
      (b) two depending side portions extending therefrom, each incorporating
         (1) loop receiving means for retainingly supporting the terminating ends of the loop portions while allowing loop deflection and free movement of the terminating ends, and
         (2) securement arms for peripherally embracing and supportingly retaining the secured portion of each loop system, whereby each of said independent loop systems is resiliently, torsionally flexible, thereby achieving a bicycle seat undercarriage which provides comfortable support and repeated resilient deflection in response to a rider's side-to-side movements.

2. The bicycle seat undercarriage defined in claim 1, wherein said wire member is also formed into a forwardly extending pommel portion.

3. The bicycle seat undercarriage defined in claim 2, wherein said wire member comprises a single, elongated, continuous wire member.

4. The bicycle seat undercarriage defined in claim 1, wherein said wire member comprises steel having a diameter between about ¼ inches and about 5/6 inches.

5. The bicycle seat undercarriage defined in claim 1, wherein said bracket member is further defined as comprising a single metal stamping incorporating a central body portion and two depending side portions extending therefrom.

6. The bicycle seat undercarriage defined in claim 5, wherein said bracket member is further defined as comprising
   (a) loop receiving aperatures formed in both depending sides thereof for retainingly supporting the terminating ends of the loop portions, and
   (b) securement arms positioned for peripherally embracing and supportingly retaining the secured portion of each loop system.

7. The bicycle seat undercarriage defined in claim 1, wherein the loop receiving means comprises an aperture formed in each depending side portion, and wherein the securement arms comprise the material removed to form the loop receiving apertures.

8. The bicycle seat undercarriage defined in claim 1, wherein said bracket member further incorporates a clamp receiving zone formed in each depending side thereof, in juxtaposed spaced relationship to each other, and adapted for cooperative interengagement with a bicycle seat post bolt and clamp assembly.

9. The bicycle seat undercarriage defined in claim 1, wherein the loop receiving means in the bracket member comprises a recess formed in each depending side portion thereof, each of said recesses being positioned for securely retaining and supportingly holding the terminating end of one of the loop portions of the loop systems.

10. The bicycle seat undercarriage defined in claim 1, wherein said loop portions extend from the bracket member at diverging dihedral angles.

11. The bicycle seat undercarriage defined in claim 10, wherein each said loop portion is further defined as lying in substantially a single plane with said plane being forwardly sloping downwardly, whereby said loop portions cooperatingly form a substantially dish-shaped rear, rider-receiving zone.

12. The bicycle seat undercarriage defined in claim 11, wherein said single plane intersects the horizontal plane of the secured portion.

13. A bicycle seat for mounting to the seat post of a bicycle, comprising
(A) a bicycle seat supporting undercarriage incorporating
  (a) a bracket member adapted for cooperative interengagement with bolt and clamp means for mounting to a bicycle seat post, and
  (b) wire means formed into two independent loop systems extending rearwardly and laterally from said bracket member, each of said loop systems comprising
    (1) a secured portion mounted to the bracket member, and
    (2) a loop portion
      (i) extending from the secured portion in a substantially continuous curve, and,
      (ii) having its terminating end retainingly engaged with said bracket member;
(B) said bracket member having
  (a) a central body portion and
  (b) two depending side portions extending therefrom, each incorporating
    (1) loop receiving means for retainingly supporting the terminating ends of the loop portions while allowing loop deflection and free movement of the terminating ends, and
    (2) securement arms for peripherally embracing and supportingly retaining the secured portion of each loop system;
(C) a support plate mounted to said bicycle seat undercarriage;
(D) padding material positioned on said support plate; and
(E) a cover peripherally surrounding and enveloping said padding material and retainingly engaged by peripheral engagement with said supporting undercarriage,
whereby an entire bicycle seat is achieved, ready for mounting to the bicycle seat post of a bicycle, which comfortably supports the rider with twin, independent, torsional loop flexibility being provided for resiliently responding to the rider's side-to-side movements.

14. The bicycle seat defined in claim 13, wherein said bicycle seat undercarriage comprises a single, elongated continuous wire member which is also formed to comprise a forwardly protruding pommel portion.

15. A bicycle seat for mounting to the seat post of a bicycle, comprising
(A) a bicycle seat-supporting central undercarriage incorporating
  (a) a bracket member adapted for cooperative interengagement with bolt means for mounting to a bicycle seat post, and
  (b) wire means formed into two independent loop systems extending rearwardly and laterally from said bracket member, each of said loop systems comprising
    (1) a secured portion mounted to the bracket member, and
    (2) a single loop portion
      (i) extending from the secured portion in a substantially continuous curve, and
      (ii) having its terminating end retainingly engaged with said bracket member;
(B) said bracket member having
  (a) a central body portion and
  (b) two depending side portions extending therefrom, each incorporating
    (1) loop receiving means for retainingly supporting the terminating ends of the loop portions while allowing loop deflection and free movement of the terminating ends, and
    (2) securement arms for peripherally embracing and supportingly retaining the secured portion of each loop system; and
(C) a one-piece unitary foamed-in-place body portion, peripherally surrounding and securely embracing said undercarriage, and comprising
  (a) a foamed-in-place padding layer, and
  (b) an outer peripheral surface layer;
whereby an entire bicycle seat is achieved ready for mounting to the bicycle seat post of a bicycle in a single, one-step, foam-in-place mold, which also attains comfortable rider support with twin, independent, torsional loop flexibility being provided for resiliently responding to the rider's oscillating movements.

16. The bicycle seat defined in claim 15, wherein said bicycle seat undercarriage comprises a single, elongated continuous wire member which is also formed to comprise a pommel portion.

17. The bicycle seat defined in claim 16, wherein the seat further incorporates sleeve members peripherally surrounding the pommel portion and each loop portion, thereby providing additional surface area for bondingly securing the foamed material.

* * * * *